(Model.)
E. L. PARMLEY.
Tobacco Hiller.
No. 239,835.                     Patented April 5, 1881.
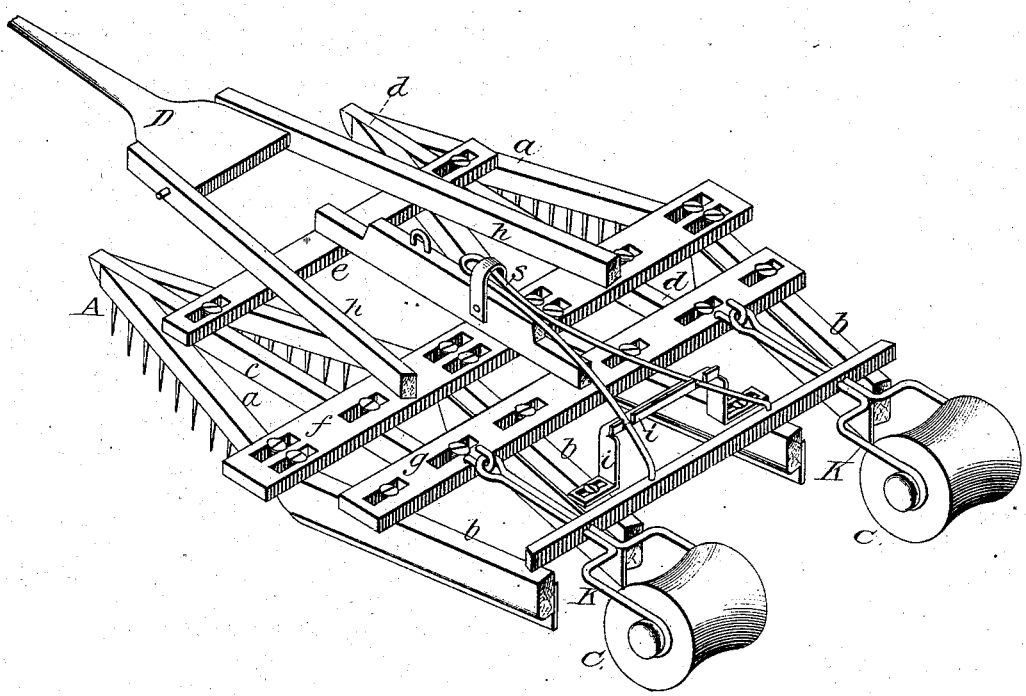
Witnesses:
A. J. O'Brien
H. H. Phelps
Inventor:
Elmer L. Parmley
By Sanford A. Hudson
his Attorney in fact

UNITED STATES PATENT OFFICE.

ELMER L. PARMLEY, OF CENTER, WISCONSIN.

TOBACCO-HILLER.

SPECIFICATION forming part of Letters Patent No. 239,835, dated April 5, 1881.

Application filed August 2, 1880. (Model.)

*To all whom it may concern:*

Be it known that I, ELMER L. PARMLEY, of Center, in the county of Rock and State of Wisconsin, have invented a new and useful Improvement in Tobacco-Hillers, which improvement is fully set forth in the following specification and accompanying drawing.

My invention relates to improvements in tobacco-hillers designed to prepare the soil for hills and elevations of proper form.

The machine is composed of double triangular harrows in advance, followed by runners to operate as ridgers integral therewith, the machine to be drawn by one pair of horses.

The object of my invention is to prepare the ground so as to make a tobacco-field into raised hills, of uniform size and distance apart, of fine fresh earth, removing the foul surface-soil to the spaces between the rows, and this I accomplish by the machine illustrated in the accompanying drawing, in which is represented a perspective view of the machine.

The letters A A represent the two right and left sections of the machine, which are adjustably connected together by slotted cross-bars $e f g$.

C C represent two concave rollers, about nine inches in length and in diameter, at each end having attachments K K to connect them to rear bar, $g$, or to the center beams, $c d$, of the right and left sections, respectively, said rollers being designed to pass over the ridges made by the machine, leaving said ridges in a convex form.

The parts $a$ of the sections A are beams two by four inches in size, set with harrow-teeth, constituting the advance triangular harrows. Parts $b$ of said sections are beams about two by six inches in size, standing edges down and projecting two inches below beams $a$, forming oblique runners, to gather the soil into ridges after the surface has been cleared by the harrows. Said runners are beveled on the outside lower edge, and a plate of iron secured to the inside edge, projecting down about one inch and a half. Parts $c d$ are longitudinal bars passing through the right and left sections. To the rear ends of the bars $c d$, or to cross-bar $g$, are pivoted the attachments K K, that connect rollers C C with the machine. Parts $e f g$ are cross-bars by which the beams are held to their places. Said bars $e f g$ are provided with longitudinal slots at their connections with the beams $a b c d$, through which they are bolted to said beams, by means of which the two sections of the machine can be adjusted to any width desired by moving the bolts in the slots. Parts $h h$ are hounds, which receive and hold the tongue D.

Upon the rear ends of the inside bars, $b$, of the sections is located and firmly secured an elevated cross-piece, $i$, standing on feet slotted so as to make it adjustable, to be used as a fulcrum, on which rests the bifurcated lever $s$, each branch of which is secured at its rear end to the cross-bar F, which connects the attachments K K of the concave rollers, and by which they are raised from the ground.

The ridges formed by this machine are to be checked off into hills by any means found most practicable.

What I claim, and desire to secure by Letters Patent, is—

A tobacco-hiller composed of right and left sections A A, adjustably connected together by means of slotted cross-bars $e f g$, the beams $a a$, provided with harrow-teeth, beams $b b$ of the rear half of said sections standing edgewise in the form of runners, the rear ends being drawn together partially and adapted to form the soil into ridges, in combination with concave rollers C C, cross-bar F, bifurcated lever $s$, and cross-piece $i$, substantially as described, and for the purposes specified.

ELMER L. PARMLEY.

Witnesses:
S. H. HUDSON,
ED. F. CARPENTER.